(12) United States Patent
Hovis et al.

(10) Patent No.: US 6,427,602 B1
(45) Date of Patent: Aug. 6, 2002

(54) PIPE CRAWLER APPARATUS

(75) Inventors: Gregory L. Hovis, North Augusta, SC (US); Scott A. Erickson, Augusta, GA (US); Bruce L. Blackmon, Aiken, SC (US)

(73) Assignee: Westinghouse Savannah River Company, LLC, Aiken, SC (US)

( * ) Notice: Subject to any disclaimer, the term of this patent is extended or adjusted under 35 U.S.C. 154(b) by 0 days.

(21) Appl. No.: 09/897,256

(22) Filed: Jul. 2, 2001

(51) Int. Cl.[7] ............................................... B61B 13/10
(52) U.S. Cl. .............................. 104/138.1; 104/138.2; 105/365
(58) Field of Search ........................ 104/138.1, 138.2; 105/365

(56) References Cited

U.S. PATENT DOCUMENTS

| | | |
|---|---|---|
| 3,298,399 A | 1/1967 | Slade |
| 3,642,032 A | 2/1972 | Cook et al. |
| 3,665,187 A * | 5/1972 | Stein ........................ 250/496.1 |
| 4,006,359 A * | 2/1977 | Sullins et al. ............. 104/138.2 |
| 4,252,152 A | 2/1981 | Martin et al. |
| 4,601,204 A * | 7/1986 | Fournot et al. ........... 104/138.2 |
| 4,919,223 A | 4/1990 | Egger et al. |
| 4,991,651 A | 2/1991 | Campbell |
| 5,018,451 A | 5/1991 | Hapstack |
| 5,121,694 A | 6/1992 | Zollinger |
| 5,309,844 A | 5/1994 | Zollinger |
| 5,375,530 A | 12/1994 | Zollinger et al. |
| 5,944,326 A * | 8/1999 | Ishibashi et al. ............ 279/119 |
| 6,031,371 A | 2/2000 | Smart |

\* cited by examiner

Primary Examiner—S. Joseph Morano
Assistant Examiner—Frantz F. Jules
(74) Attorney, Agent, or Firm—Dority & Manning, PA

(57) ABSTRACT

A pipe crawler apparatus particularly useful for 3-inch and 4-inch diameter pipes is provided. The pipe crawler apparatus uses a gripping apparatus in which a free end of a piston rod is modified with a bearing retaining groove. Bearings, placed within the groove, are directed against a camming surface of three respective pivoting support members. The non-pivoting ends of the support members carry a foot-like gripping member that, upon pivoting of the support member, engages the interior wall of the pipe.

4 Claims, 8 Drawing Sheets

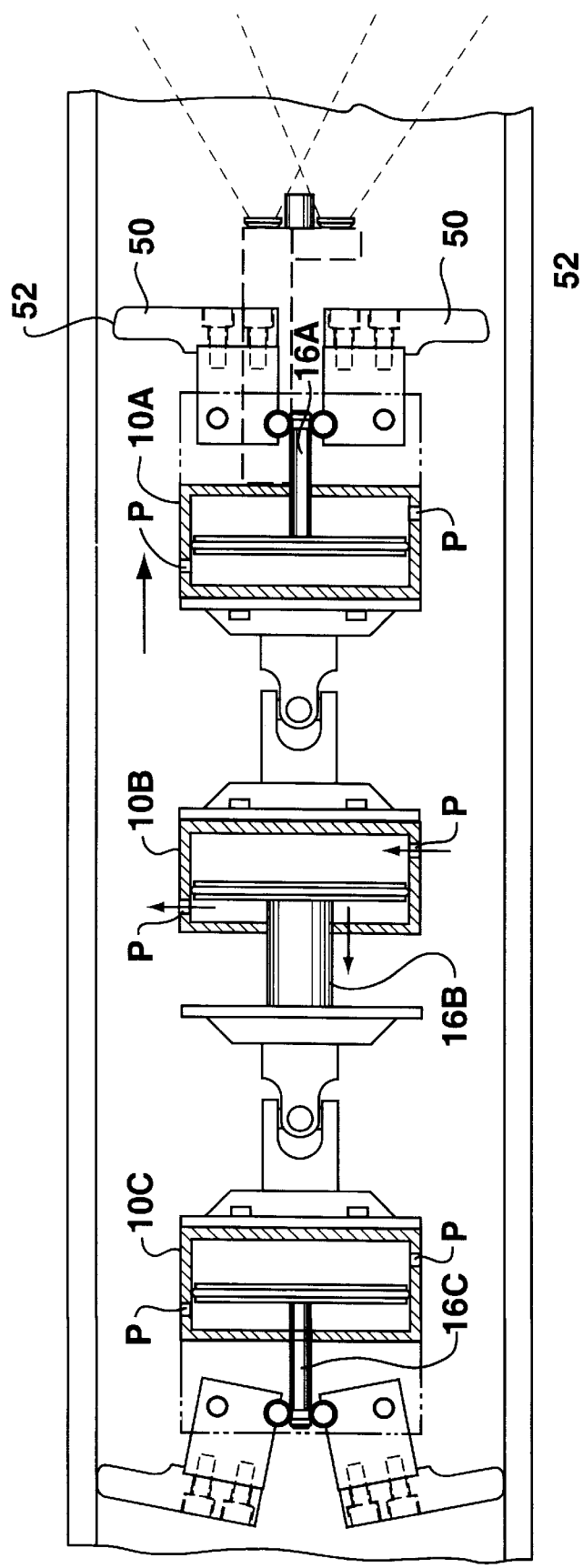

PIPE CRAWLER APPARATUS

STATEMENT AS TO RIGHTS TO INVENTIONS MADE UNDER FEDERALLY SPONSORED RESEARCH AND DEVELOPMENT

The United States Government has rights in this invention pursuant to contract no. DE-AC09-96SR18500 between the U.S. Department of Energy and Westinghouse Savannah River Company L.L.C.

FIELD OF THE INVENTION

The present invention relates to inspection apparatuses known in the industry as pipe crawlers. Pipe crawlers are used to inspect the interior of pipes and similar passageways associated with water and sewage systems, industrial piping such as chemical or gas conduits, and piping used within nuclear reactors or related caustic or high stress environments. Pipe crawlers are frequently used to deploy monitoring equipment including sensors and/or cameras, to monitor the pipe integrity, and to help diagnose needed repairs or maintenance.

BACKGROUND OF THE INVENTION

Pipe crawlers, pipe inspection "rabbits" and similar vehicles are widely used for inspecting the interior surfaces of piping systems, storage tanks, and process vessels for damaged or flawed structural features. Typically, such devices include a testing probe, sensor, or camera carried by a support structure that travels through the piping system being inspected.

Many of the remote inspection devices have been designed for pipes having a six-inch or greater inner diameter. However, there remains a need for the inspection of smaller diameter pipes. While current advances in miniaturization technology have made cameras and sensors small enough to fit within a small diameter pipe, there have been few advances in the design of a delivery vehicle having adequate motive forces to deploy a small diameter inspection vehicle through a pipe system. For example, miniature electric motors do not provide enough motive force to pull extensive length tethers behind the crawler. Similarly, miniature air cylinders do not have the capacity to generate enough pushing force directly against the inner-walled pipe as is required for inch-worm motion.

The art teaches a variety of pipe inspection apparatuses. Two such apparatuses are taught in U.S. Pat. Nos. 5,770,800 and 5,398,560, assigned to the U.S. Department of Energy and incorporated herein by reference. These pipe inspection apparatuses move through the use of differential hydraulic pressure or the use of a pipe pig to carry the apparatus.

U.S. Pat. No. 4,460,920 to Weber describes a remote controlled pipe crawler having front and rear stepping bodies interconnected by a gimbal joint. U.S. Pat. No. 4,601,204 Fournot et al teaches a duct crawler having pneumatically or hydraulically operated pivot arms and rubber gripping feet used in a pull-pusher combination mode. However, there are limitations to the size and motive force capable of being exerted by the prior art devices as set forth above.

In particular, there is a need for a pipe inspection apparatus delivery vehicle that will provide the necessary motive force for small diameter pipes. The apparatus should be dimensioned to pass through various sizes of piping and be able to readily negotiate bends in the piping. In addition, the pipe crawler should be able to generate a sufficient motive force that can propel inspection equipment and the resulting physical and electronic tether through extended lengths of piping.

Accordingly, there remains room for variation and improvement within the art.

SUMMARY OF THE INVENTION

One aspect of the present invention is to provide a flexible pipe crawler having sufficient motive force to successfully traverse small diameter pipes while attached to remote monitoring equipment and sensors.

It is yet another aspect of the present invention to provide a pipe crawler apparatus in which a pneumatic piston is used to actuate a plurality of pivoting grip members, each grip member being used to engage the interior of a pipe.

It is an additional aspect of the present invention to provide a pipe crawler capable of negotiating 3 inch and 4 inch inner diameter pipe using the selective, intermittent pushing and pulling action of an air cylinder. The air cylinder is operatively connected on opposite ends to a respective first gripping unit and a second gripping unit. The first and the second gripping units are used to selectively engage and disengage the pipe crawler with respect to the interior of the pipe while the intervening air cylinder proceeds to move the non-engaged gripping unit within the pipe.

It is yet another aspect of the present invention to provide an improved gripping unit for use in a pipe crawler apparatus. The gripping unit translates the linear motion of a piston rod to bring about the pivoting action of multiple support posts. Each post carries on a non-pivoting end a gripping member adapted for engaging an inner pipe surface.

The gripping pneumatic unit provides a stronger interengagement with the pipe interior than the direct application of a piston rod against the interior surface of a pipe. Accordingly, the gripping unit of the present invention enables a pipe crawler apparatus that can operate carrying a greater weight load than a conventionally constructed pipe crawler.

Further, the present invention allows a compact design having sufficient motive force capability such that small diameter pipes may be accessed and surveyed using the pipe crawler constructed according to the present invention.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying drawings.

FIGS. 3A through 3E illustrate the intermittent pushing and pulling action of the pipe crawler apparatus.

DETAILED DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

Figure 1:
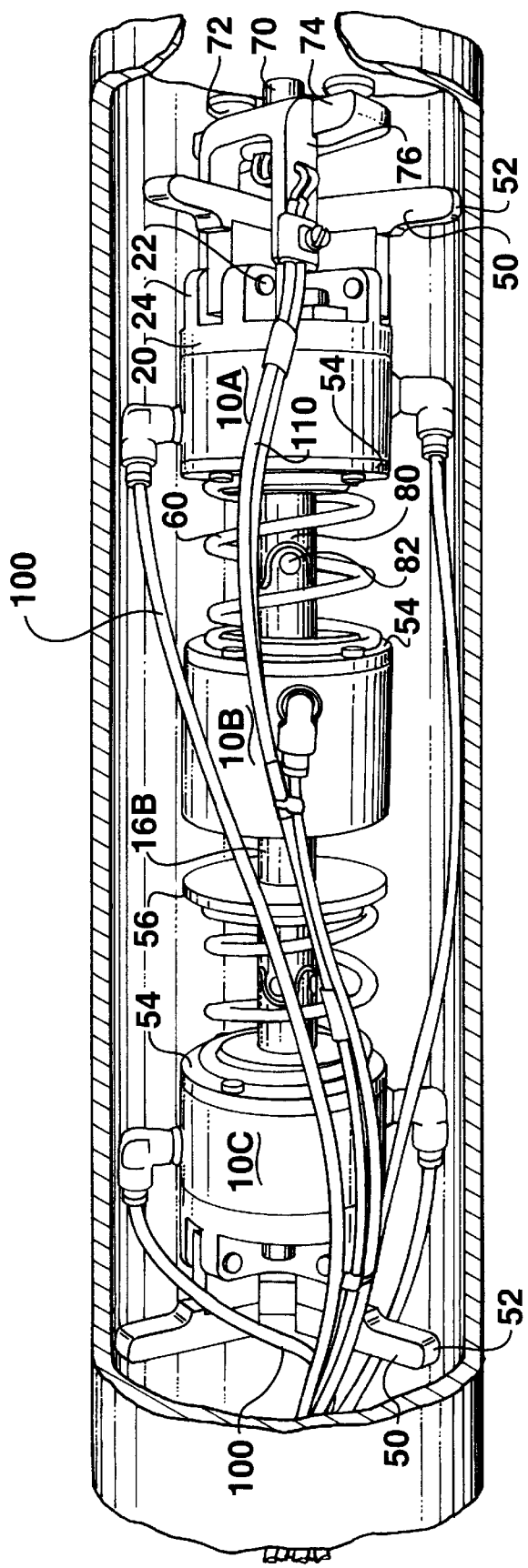
FIG. 1 is a perspective view of a pipe crawler apparatus as depicted within a cut-away portion of a pipe.
Figure 2:
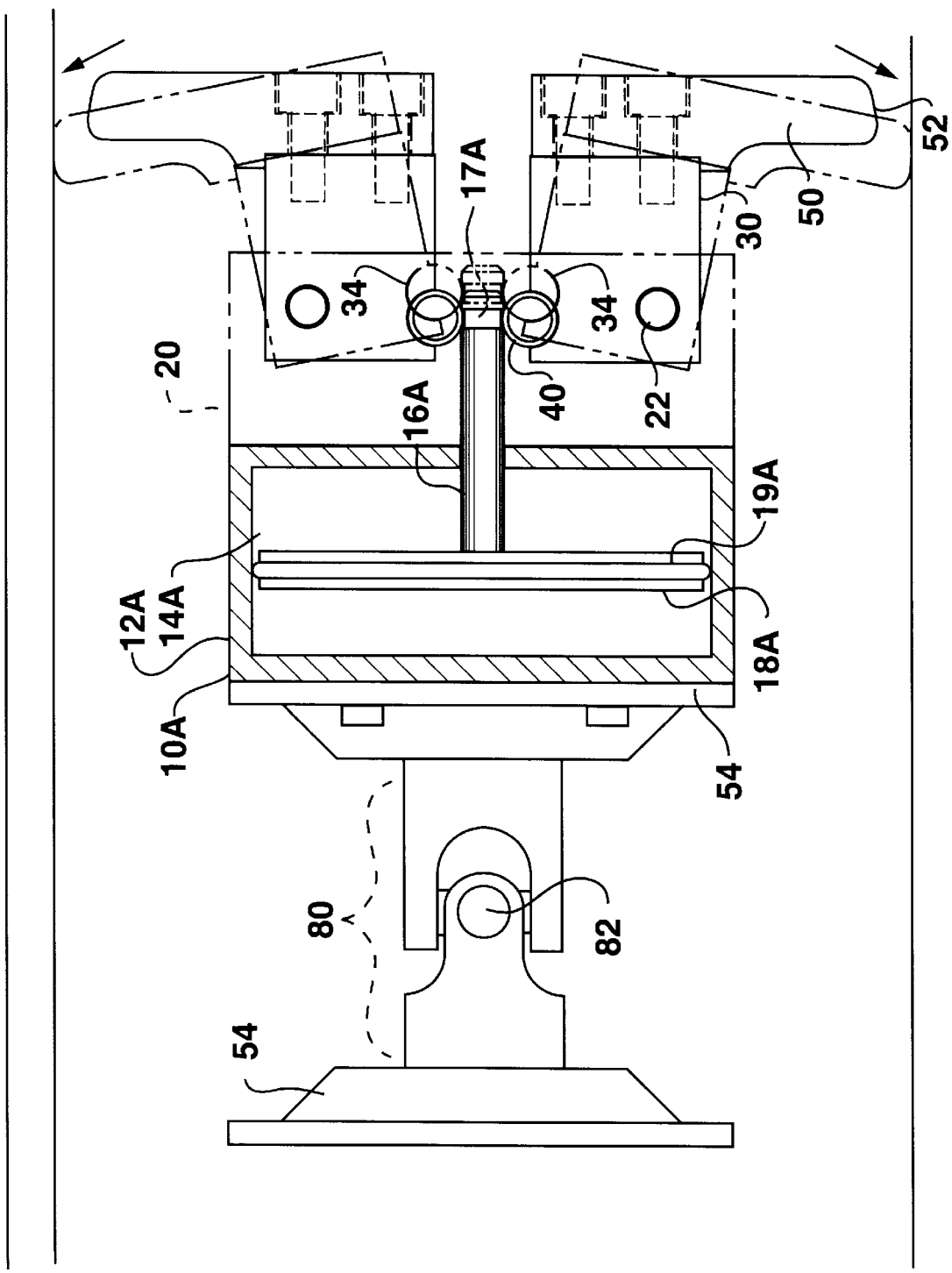
FIG. 2 is a schematic view of a single gripping unit showing additional details of the construction and operation of the gripping unit.

As seen in reference to FIGS. 1 and 2, a preferred embodiment for a pipe crawler apparatus 10 is provided by a series of joined piston units seen as units 10A through 10C. The right side of the pipe crawler drive apparatus 10 is designated as the front "F" and is associated with unit 10A. Unit 10A has a housing 12A that defines a first air cylinder 14A, a piston rod 16A having a first end in communication with a pressure plate 18A and gasket 19A carried within the air cylinder 12A, and a second free end. The front end of unit 10A supports a frame 20 that defines a central cavity adapted for passing through the free end of piston rod 16A.

Figure 4:
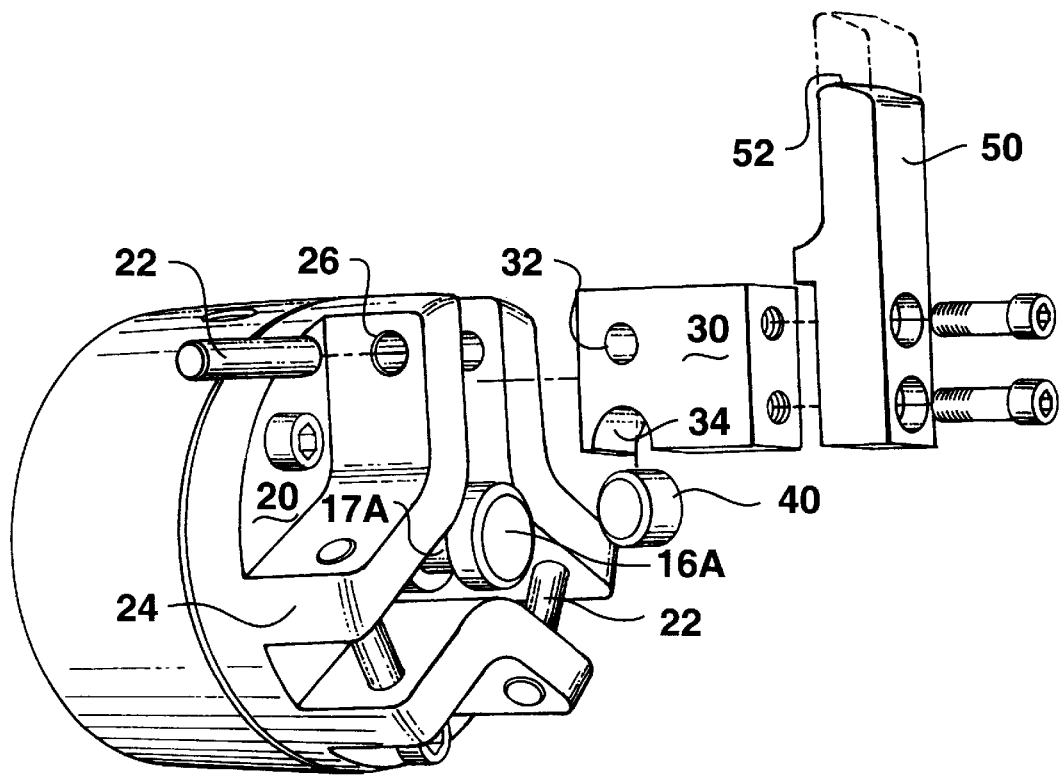
FIG. 4 is an exploded perspective view of the cam-actuated pivoting gripping members of the pipe crawler apparatus.

As best seen in FIG. 4, frame 20A defines a plurality of posts 30 that are pivotally connected to the frame and that are secured to side plates 24 of frame 20 through respective pins 22. Side plates 24 further define apertures 26. Pins 22 are received through apertures 26 along with apertures 32 defined by post 30. Adjacent the pin receiving apertures 32, a camming surface, seen here in the form of an arcuate notch 34, is defined by each post 30.

Post 30 is secured to the frame 20 via pins 22 thereby placing camming surface 32 opposite the piston rod 16A. Piston rod 16A defines a circumferential groove 17A opposite cam surface 34. A cylindrical bearing 40 is positioned between the notch 34 and the oppositely spaced groove 17A, bearing 40 thereby operatively engaging both notch 34 and groove 17A. Bearing 40 is held in position by opposing side plates 24 opposite the end walls of bearing 40.

As piston rod 16A is extended outwardly toward the front of pipe crawler apparatus 10, the piston movement directs bearing 40 in further engagement with the cam surface defined by notch 34, thereby causing post 30 to pivot outwardly as seen by the directional arrows in FIG. 2. The pivoting motion, in turn, directs an outer edge 52 of gripping member 50 to extend away from an axis of the pipe crawler apparatus 10 and thereby engage an interior surface of the surrounding pipe.

The plurality of springs 60 provides sufficient tension such that the respective drive and gripping units are maintained in a substantially axial alignment when the pipe crawler apparatus is in a horizontal orientation. Preferably, when one set of grippers are engaged into the interior pipe wall, the pipe crawler apparatus is sufficiently rigid that the apparatus does not otherwise sag or touch the adjacent pipe walls. Further, the springs 60 are sufficiently pliant that the pipe crawler apparatus may negotiate sharp bends and turns. Following a turn, the spring 60 will provide sufficient tension to bring about an axial alignment of the pipe crawler when in a horizontal portion of pipe. This arrangement prevents damage from occurring to the pipe interior walls or to the pipe crawler apparatus that could otherwise be created by friction between the components of the pipe crawler apparatus and the pipe interior walls.

Gripping unit 10C operates in an identical fashion and has the corresponding construction and operation of gripper unit 10A. Accordingly, similar reference numerals are used on the figures with the letter "C" being used to designate certain structures associated with gripping unit 10C. As best seen in reference to FIG. 1, unit 10C has a reverse orientation with respect to unit 10A.

When placed within the operative environment of a pipe interior, cylinder 14A extends rod 16A, causing the bearings 40 to engage cam 34. The pressure exerted by the three respective bearings 40 onto the corresponding three cams 34 pivots each cam post 30 to thereby engage the inner pipe wall by the respective edges 52 of attached gripping members 50. As best seen in reference to FIG. 4, gripping members 50, seen here in the form of a foot-shaped unit, may be secured to post 30 through threaded fasteners such as screws or bolts. The reversible nature of the attachment allows grippers 50 to be replaced as needed. It also allows various sizes, textures, and shapes of grippers 50 to be used in the pipe crawler apparatus 10.

Opposite the base portion of gripper unit 10A, a piston drive unit 10B is provided. Drive unit 10B has a housing 12B that defines a first air cylinder 14B, a piston rod 16B having a first end in communication with a pressure plate 18B that is carried within the housing 12B, and a second free end. The front end of drive unit 10B extends axially in a rearward direction seen in reference to apparatus 10 of FIG. 1. An inner connecting member 80 connects unit 10A to unit 10B. As best seen in reference to FIG. 1, connecting member 80 may be in the form of respective interconnected rods, the interconnection being in the form of a universal joint 82. The respective end portions of connecting member 80 may be threadedly attached to a cover plate 54 attached at the base of each respective unit 10A and 10B.

A coiled spring 60 may be placed between the units 10A and 10B with the connecting member 80 traversing through the interior of the spring 60. Spring 60 is held under tension between the respective unit 10A and 10B. Preferably, the exterior surface of each cover plate 54 defines a circular flange region upon which terminal portions of spring 60 may be seated. A free end of piston 16B is threadedly attached to a circular disc member 56. A portion of the piston rod 16B may traverse and extend past the disc member 56. The extended portion is used to threadedly attach a second attachment member 80 that is in turn connected to a base of a second piston gripper unit 10C. A second spring 60 is positioned between units 10B and 10C similar to the arrangement seen between units 10A and 10B.

Figure 3A:
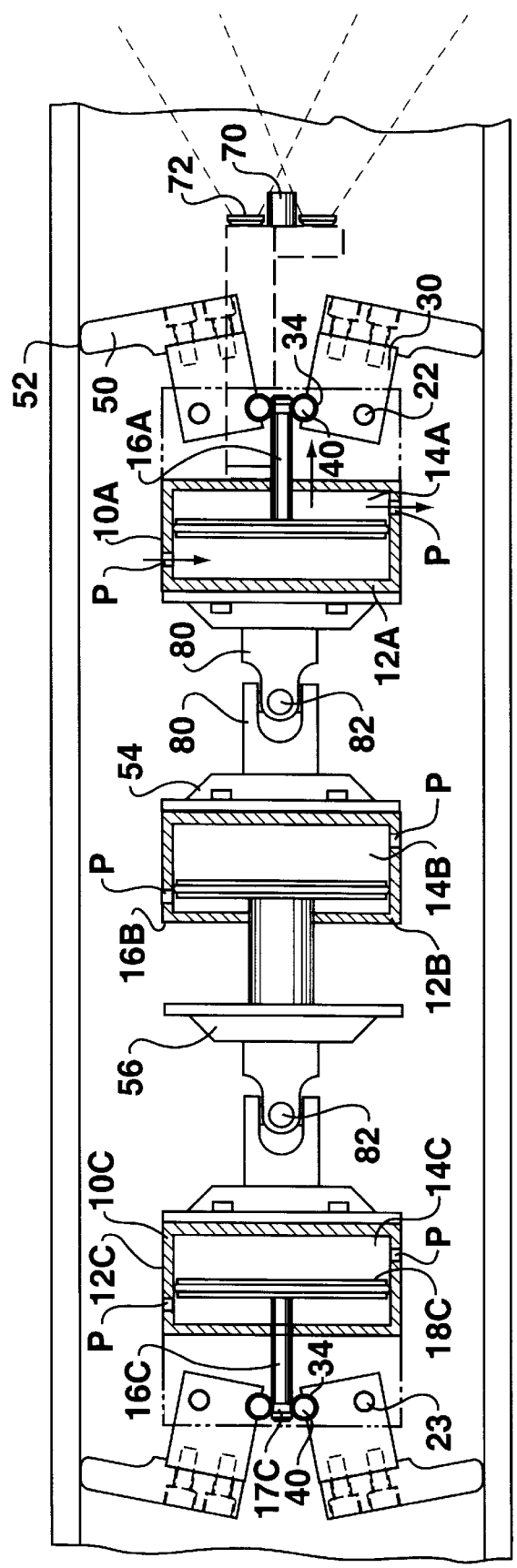
Figure 3B:
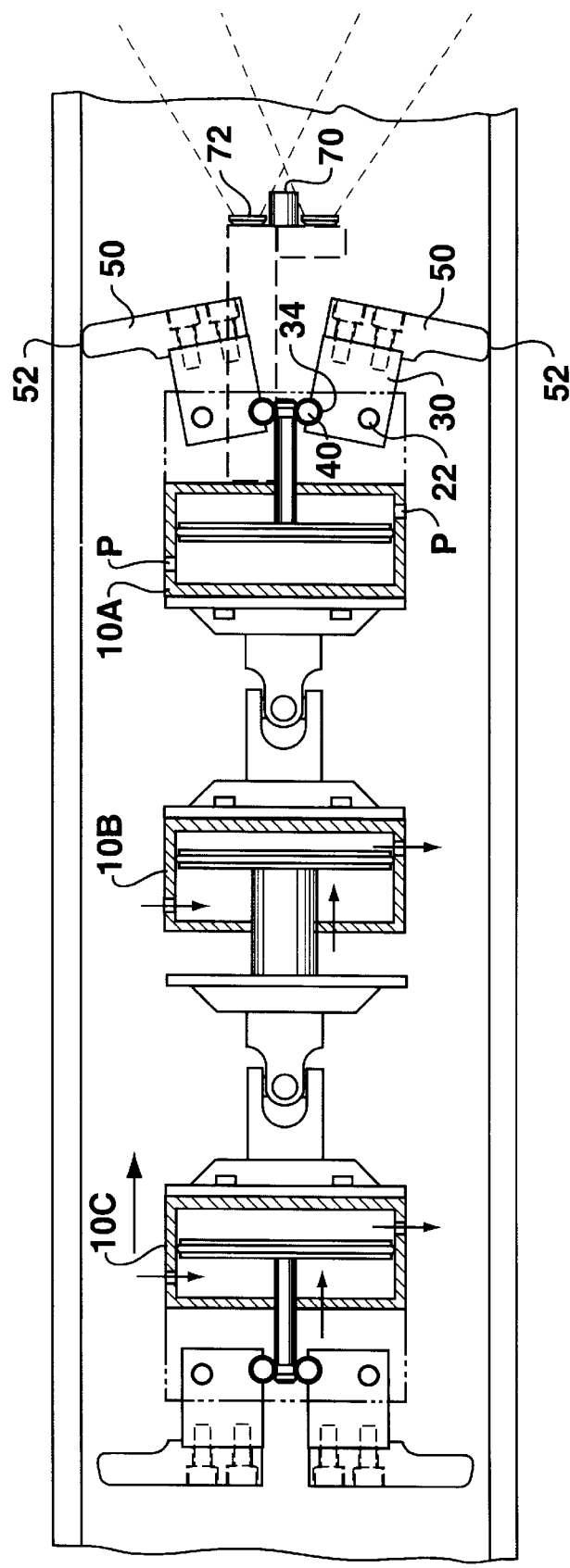
Figure 3C:
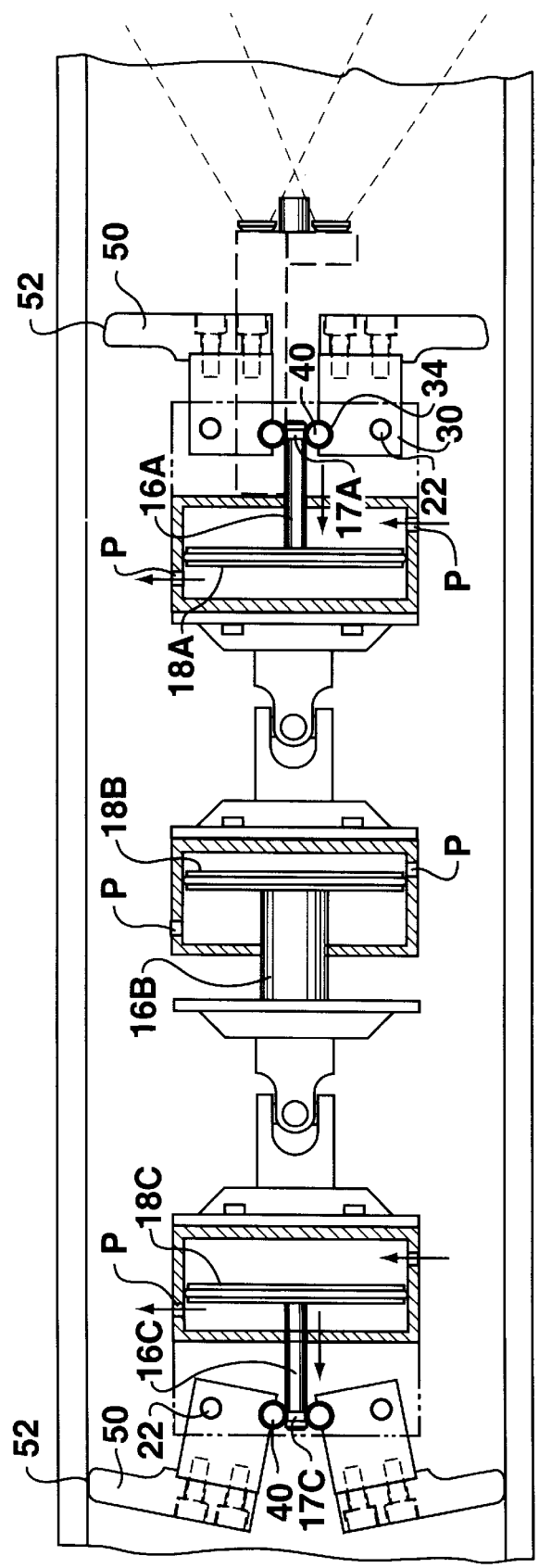
Figure 3E:
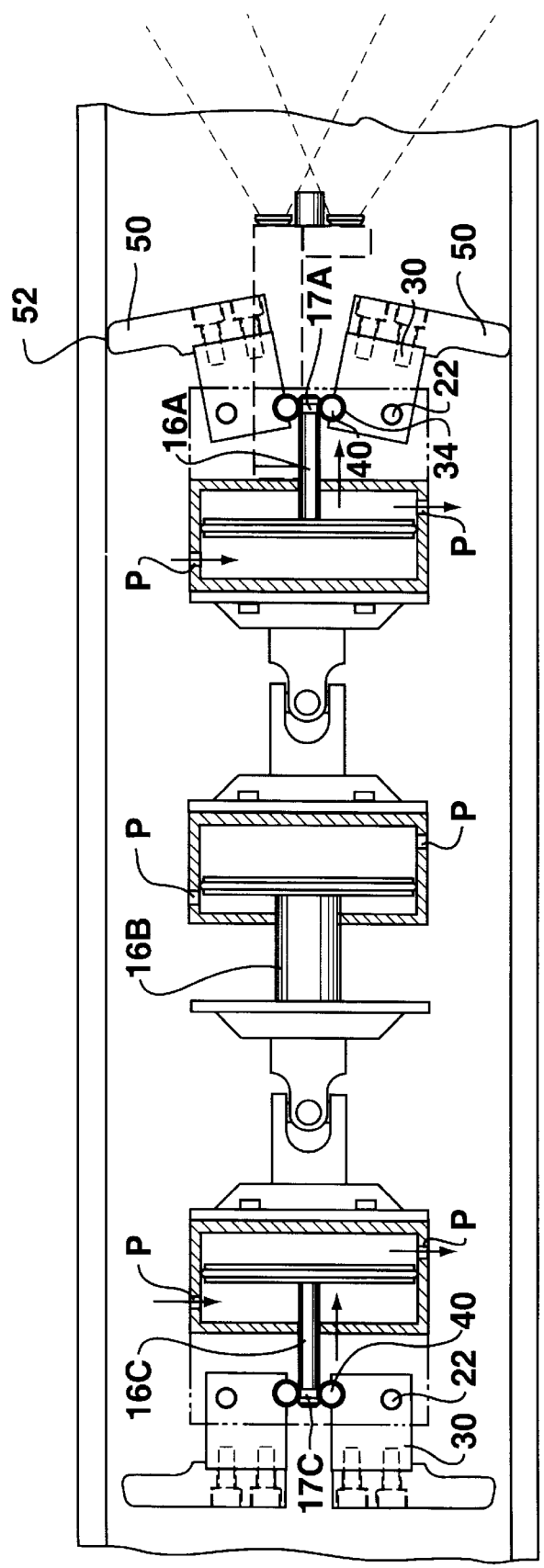

As best seen in reference to FIGS. 3A through 3E, the operation of the pipe crawler apparatus 10 makes use of the intermittent gripping action of gripping units 10A and 10C. As seen in FIG. 3A, when the gripping portions of unit 10A are engaged to the interior wall of the pipe, drive unit 10B has piston rod 16B fully extended. As seen in reference to FIG. 3B, piston rod 16B is retracted inside housing 12B, thereby pulling disengaged gripper unit 10C in an axial direction toward unit 10A. Next, as seen in reference to FIG. 3C, gripping unit 10C is used to engage the interior walls of the pipe. Upon engagement, drive unit 10B is used to extend piston rod 16B (FIG. 3D) and thereby extends in a forward direction the disengaged gripping unit 10A along with the housing portion 12B of drive unit 10B. Once drive unit 10B is fully extended, the gripping members of unit 10A again engage the interior walls of the pipe wherein the inch-worm type motion may be repeated. The sequence of motions may be readily repeated to bring about a reverse direction of travel for the pipe crawler apparatus 10. Alternatively, for removal from a conduit, it is possible to use the accompanying tethers to physically pull the disengaged pipe crawler apparatus 10 from the pipe.

Each piston, 10A, 10B, and 10C makes use of air pressure changes within the respective cylinder to bring about movement of the pressure plate and attached piston rod. As seen in reference to FIG. 1, a plurality of pneumatic air lines 100 is supplied to the pipe crawler apparatus 10. Each cylinder is in communication with a pair of individual air lines 100. Each cylinder defines a pair of ports "P" through which an individual air line 100 is in communication. As best seen in references to FIGS. 3A through 3B, the flow pathway of pressurized air or other fluid into and from each cylinder is illustrated by diagrammatic arrows and that depict the standard operation of a cylinder as is conventional and well known within the art.

For instance, pressure plate 18A divides the interior of air cylinder 14A into two discrete chambers. Pressure applied along air line 100 into one portion of a cylinder interior will force the pressure plate and associated rod 16A to move. During the movement, the air pressure supplied along line 100 to the second part of the cylinder is released, allowing air on the opposite side of the pressure plate to exit the cylinder as the plate advances. Upon reversing of the air pressure and air flow pathways, the reverse movement of the cylinder is carried out.

As further seen in reference to FIG. 1, an additional supply line 110 is provided, which is used to provide electric power to the lights and camera and also to provide a video line for transmitting the camera image to the remote operator. The control of the lights, camera, and various pneumatic lines may be fully automated using a series of control switches and valves in communication with the respective individual air lines 100. Properly synchronized, a rapid movement of the pipe crawler apparatus through a pipe or similar conduit is obtained.

Accordingly, the movement of the pipe crawler is in a step-wise fashion as the engagement and disengagement of the cam feet is used to hold alternating ends of the pipe crawler stationary. The air cylinder of unit 10B is used to alternately push the front unit 10A in a forward direction then pull the rear section 10C of the pipe crawler. The use of the pneumatically actuated cam-driven feet provides a surprisingly strong motive force, which has been found capable of pulling significant loads while traversing a vertical pipe. The pipe crawler also has a series of flexible universal joints 82 that permit turns and bends to be negotiated. The components can be assembled so that the pipe crawler is able to negotiate a 4 inch schedule 160 pipe (inner diameter 3.44 inches). In such a narrow confine, miniature electric motors and air cylinders lack the strength to perform adequately using prior art motive techniques. The mechanical advantages offered by the cam driven feet affords capabilities for pipe inspection heretofore unavailable.

The length of the piston rod 16B of the drive unit 10B may be varied. By selecting a drive unit having a longer length piston rod, the drive unit is capable of a greater "throw" distance with each stroke of the piston. However, a smaller length piston is preferred in applications where the pipe crawler apparatus 10 must negotiate right-angle bends or other sharp curves in the piping system. Otherwise, the extended length of drive unit 10B would be unable to traverse sharp bends.

Figure 5:
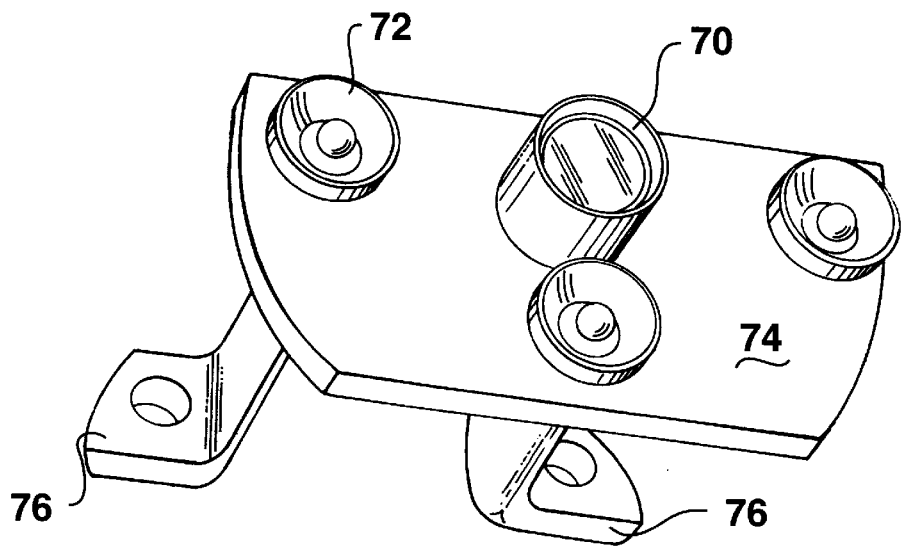
FIG. 5 is a perspective end view of the camera and lighting system used in association with the pipe crawler apparatus.

As seen in reference to FIG. 5, an upper portion of drive unit 10A, corresponding to the front of the pipe crawler apparatus 10, may be equipped with a camera 70 along with a series of lights, seen here in the form of light-emitting diodes (LEDs) 72. Lights 72 and camera 70 are mounted on a support plate 74. Support plate 74 is, in turn, supported along legs 76, which attaches to frame 20A. As illustrated, the light and camera assembly seen in FIG. 5 is carried in an elevated position with respect to the underlying frame 20. This positioning allows the previously described operation of the piston, post, and gripping members to proceed without interruption. While not separately illustrated, a similar light and camera assembly could also be attached to the rear portion of the pipe crawler apparatus 10 corresponding to gripper unit 10C.

As seen in reference to FIG. 1, a preferred embodiment of the pipe crawler uses three cam operated feet, each foot positioned approximately 120 degrees apart with respect to the pipe crawler circumference. If four spaced cams and grippers (90 degrees apart) were to be used, surface irregularities in the pipe interior would at times permit only two opposite grippers to engage the wall, the other opposing pair failing to contact the inner wall surface The use of only three cams allows a single piston rod to provide an engaging force via three cams and three grippers to provide tight engagement with the pipe wall.

The preferred embodiment described above sets forth a pipe crawler apparatus in which a single drive unit 10B is used to move oppositely positioned gripper units 10A and 10C. It is readily understood by one having ordinary skill in the art that additional tools and segments may be added within the body portion of the pipe crawler apparatus. Such segments may include various sensors and diagnostic arrays that are deployed by the pipe crawler apparatus. Further, any number of additional gripping units and/or drive units may be added as needed to provide sufficient motive power to a pipe crawler apparatus. For instance, multiple gripper units 10A could be coupled in series along with multiple gripper units 10C. Units 10A may be operated in tandem and clustered along the front of the pipe crawler apparatus 10. In turn, gripper units 10C may be positioned along the rear of the pipe crawler apparatus and also designed to operate in tandem with each other. One or more drive units 10B may then be used to provide the inch-worm motion to the pipe crawler apparatus.

Many variations, changes, and substitutions will be apparent to one having ordinary skill in the art. Such changes and substitutions can be made to the preferred embodiment herein described without departing from the spirit and scope of the present invention as defined by the following claims.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

What is claimed:

1. A pipe crawler apparatus comprising:

a first pneumatic gripping unit for engaging an interior of a pipe, said first pneumatic gripping unit having a piston rod in operative communication with an air cylinder, a free end of the piston rod defining a circular groove; a cylindrical bearing, in communication with said circular groove, said cylindrical bearing in further communication with a cam surface defined by an adjacent support member, said support member pivotally connected to a frame, the frame defining an opening surrounding the piston rod, said support member defining a foot for selective engagement with an interior wall of a pipe;

a second pneumatic gripping unit for engagement of an interior of a pipe, said second pneumatic engagement unit having a piston rod in operative communication with an air cylinder, a free end of the piston rod defining a circular groove; a cylindrical bearing, in communication with said circular groove, said bearing in further communication with a cam surface defined by an adjacent support member, said support member pivotally connected to a frame, the frame defining an opening surrounding said piston rod, said support member defining a foot for selective engagement with an interior wall of a pipe; and, a pneumatic cylinder positioned between the first pneumatic gripping unit and the second pneumatic gripping unit, said first and said second gripping units connected to the pneumatic cylinder along a respective first and second universal joint.

2. The pipe crawler apparatus according to claim 1 wherein said first pneumatic gripping unit and said second pneumatic gripping unit each further define three cylindrical bearings, each bearing in communication with a portion of the circular groove, each bearing being in further communication with a respective cam surface of a respective adjacent support member, each of said support members pivotally connected to the frame, each support member further defining an individual foot.

3. A gripping apparatus for use with a pipe crawler apparatus comprising:

a cylinder defining a pressure chamber within a housing;

a pressure plate positioned within the housing and responsive to a pressure differential within the housing, said pressure plate having a piston rod extending therefrom;

a circular groove defined on a surface of the piston rod;

a cylindrical bearing positioned within a portion of the circular groove, the cylindrical bearing being in further communication with a cam surface defined by a support member, the support member being substantially parallel to the piston and being pivotally carried to a frame supported by the pneumatic cylinder;

a foot carried by the support member, the foot defining an outer surface for selective engagement with a pipe wall upon pivoting of the support member.

4. A method of gripping the interior wall of a pipe comprising:

extending in an axial direction a rod of a pressure cylinder, the rod defining a groove along a circumferential rod surface;

engaging three cylindrical bearings, each cylindrical bearing being positioned partially within said groove and positioned approximately 120 degrees apart in reference to said rod;

directing each of said three cylindrical bearings into a respective cam surface defined by each of three support members;

pivoting a base of each of said three support members in response to the engagement of the cam surface by the cylindrical bearings, thereby engaging an interior wall surface of a surrounding pipe with a foot member carried by a free end of each support member.

* * * * *